Figures 1, 2, 3:
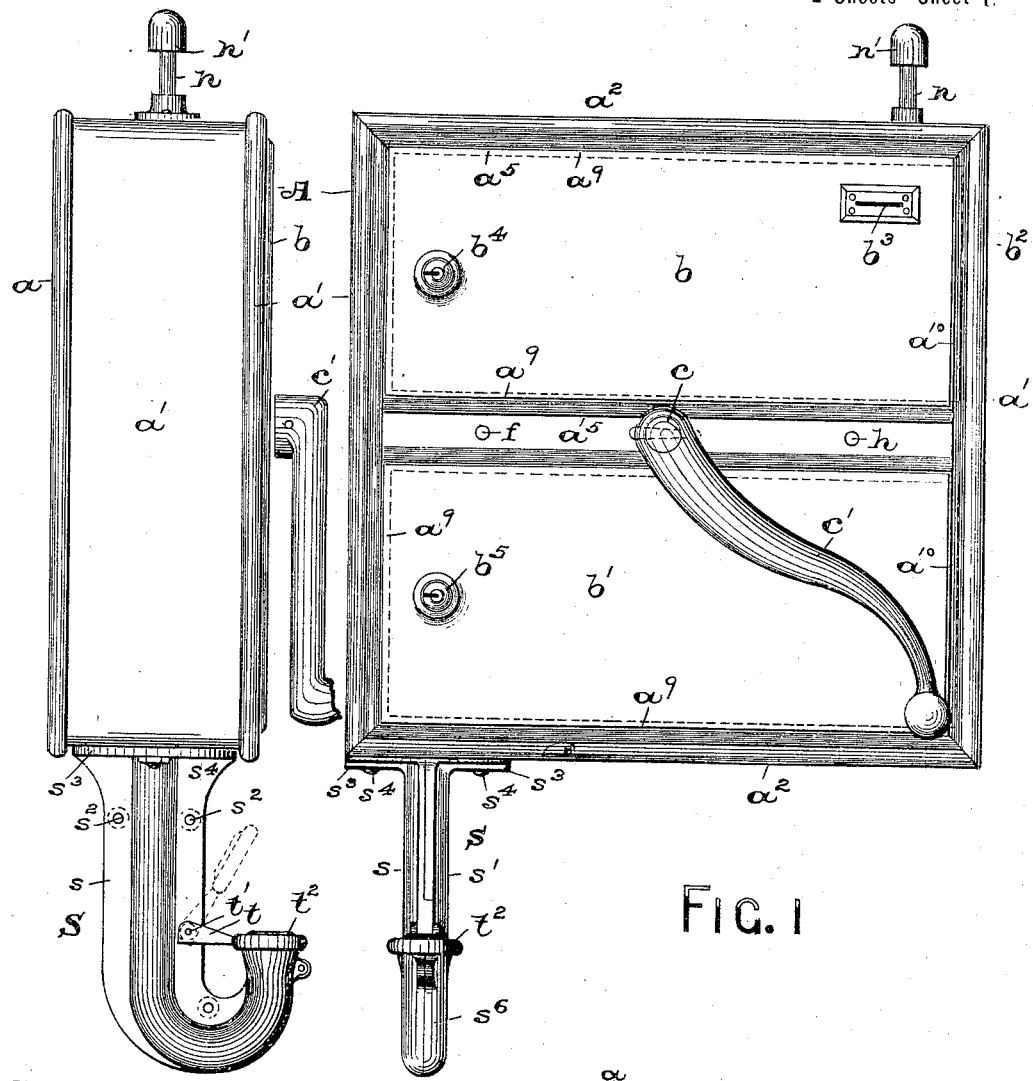

No. 643,264. Patented Feb. 13, 1900.
C. C. CLAWSON.
AIR PUMP FOR TIRE INFLATION.
(Application filed Oct. 4, 1899.)

(No Model.) 2 Sheets—Sheet 1.

WITNESSES: Harry Martin, Marcy J. Trusdell

INVENTOR: CLEMENT C. CLAWSON,
BY Fred C. Fraentzel,
ATTORNEY

No. 643,264. Patented Feb. 13, 1900.
C. C. CLAWSON.
AIR PUMP FOR TIRE INFLATION.
(Application filed Oct. 4, 1899.)
(No Model.) 2 Sheets—Sheet 2.
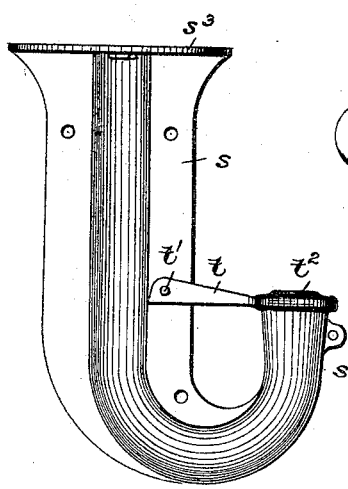
FIG. 4.
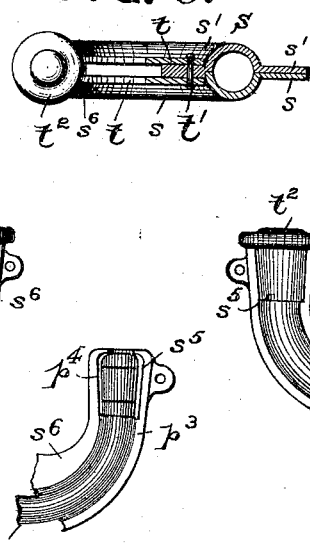
FIG. 6.
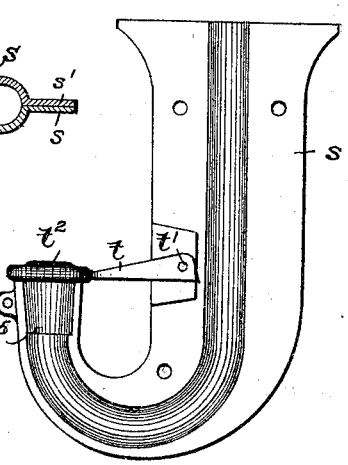
FIG. 5.
FIG. 7.
WITNESSES:
Harry Martin
Marcy Z. Trusdell
INVENTOR:
CLEMENT C. CLAWSON,
BY
Fred C. Fraentzel,
ATTORNEY

UNITED STATES PATENT OFFICE.

CLEMENT C. CLAWSON, OF NEWARK, NEW JERSEY.

AIR-PUMP FOR TIRE INFLATION.

SPECIFICATION forming part of Letters Patent No. 643,264, dated February 13, 1900.

Original application filed March 31, 1899, Serial No. 711,193. Divided and this application filed October 4, 1899. Serial No. 732,503. (No model.)

*To all whom it may concern:*

Be it known that I, CLEMENT C. CLAWSON, a citizen of the United States, residing at Newark, in the county of Essex and State of New Jersey, have invented certain new and useful Improvements in Tire-Inflating Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention, which relates to improvements in air-pump-operating mechanism for the inflation of the tires of bicycles and other vehicles, is a division of my former application for Letters Patent for improvements in coin-controlled air-pump-operating mechanism filed March 31, 1899, Serial No. 711,193; and my present invention has for its primary object to provide an apparatus which can be secured to the side of a building or upon a post and has a supporting-bracket provided with an air duct or tube which communicates with the air pump or pumps within a suitable casing of the device to enable riders of bicycles and other vehicles to place the air-valve connected with the tire of a wheel in communication with the end of said bracket and the tube or duct in said bracket and then inflate the tires of their vehicles by turning a crank of the apparatus and forcing the air into the tire to fully inflate the same.

A further object of this invention is to provide an apparatus having a bracket of the nature above set forth and a coin-controlled pump-operating mechanism within the casing of the device, which latter can be freed by depositing a coin in a coin-slot to enable the turning of the crank for operating the mechanism.

My present invention therefore consists in the novel arrangements and combinations of the various parts hereinafter set forth and in the details of the construction thereof, all of which will be finally embodied in the clauses of the claim, which constitute a part of this specification.

The invention is clearly illustrated in the accompanying drawings, in which—

Figure 1 is a front view of my novel construction of apparatus. Fig. 2 is an end view of the same, and Fig. 3 represents a top or plan view of the apparatus, all of said figures illustrating in connection therewith an arrangement of supporting-bracket which forms a part of this invention. Fig. 4 is a side view of the wheel-supporting bracket employed in connection with the apparatus. Fig. 5 is a face view of one of the bracket-sections, and Fig. 6 is a horizontal cross-section of the two bracket-sections, illustrating one manner of securing them together for the retention of an air-tube therebetween. Fig. 7 is a detail view of the upper and inner portion of one of the bracket-sections, with the end portion of the air-tube in position.

Similar letters of reference are employed in all of the said above-described views to indicate corresponding parts.

In said drawings, A designates a suitable casing of iron or wood, which is preferably of the shape indicated in the several figures of the drawings, but may be of any other desirable configuration, the said casing being provided with a back $a$, sides $a'$, and a top and bottom $a^2$. The said back may be provided with a suitable means for attaching the casing to the side of a building or upon a post, as will be clearly evident.

The sides and the top and bottom pieces of the casing A are preferably provided with a suitable and ornamental molding $a^5$ and a cross piece or bar which connects the two sides $a'$ of the casing A in such a manner that an opening will be formed at the top and an opening will be formed in the lower portion of the front of the casing. The said openings are usually formed with marginal flanges $a^9$, on which can be made to rest the doors $b$ and $b'$, as indicated in Fig. 1. In the door $b$ is the usual form of coin-slot $b^3$ and a lock $b^4$, while the door $b'$ is provided with a lock $b^5$, whereby, as will be clearly evident, the said doors can be securely held in their locked positions in said openings in the front on the casing A to protect the mechanism within the casing and drevent tampering with the same.

In suitable bearing portions in the cross piece or bar and in the back of the casing A is rotatively arranged a main shaft $c$, which projects from the front of the said piece or bar and has a crank $c'$ secured thereto, as indicated. Within said casing A and operated from said shaft $c$ is an air-pump-operating mechanism of any desirable construction, but preferably of the construction set forth in my former application for Letters Patent, Serial No. 711,193, a tube or pipe $p^3$ being connected with the pump mechanism, said pipe leading from the casing A and being arranged between a pair of grooved plates $s$ and $s'$ of a bracket or support S. The said grooved plates $s$ and $s'$ are suitably secured together by means of screws or pins $s^2$ and are also provided with flanges $s^3$ for attaching said plates against the under side of said casing A by means of screws $s^4$ or any other suitable fastening means. As shown, the end of the tube or pipe $p^3$ is provided with a nozzle-shaped enlargement $p^4$, which is arranged in a socket portion $s^5$ of a pair of upwardly-extending parts $s^6$ of said plates $s$ and $s'$. The tire-valve of the wheel of a bicycle or other vehicle can thus be arranged upon said enlargement $p^4$, the gooseneck formed by the parts $s^6$ serving to properly support the wheel, and by operating the pump mechanism the tire can be fully inflated.

In order to protect the air-outlet in the gooseneck, an arm $t$ may be pivotally arranged on a pin $t'$ in said bracket S, said arm having a cap $t^2$, which fits over said outlet when not in use to protect the same from dirt, dust, or other foreign matter.

Having thus described my invention, what I claim is—

1. In combination with pumping mechanism inclosed in a casing, a rigid wheel-support on the outer side of said casing, said support having a gooseneck and an opening therein, and a pipe connecting the pump mechanism with said wheel-support, substantially as and for the purposes set forth.

2. In combination with pumping mechanism inclosed in a casing, a rigid wheel-support on the outer side of said casing, consisting, essentially, of a pair of grooved plates $s$ and $s'$, means for securing them together, a gooseneck $s^6$, and a pipe $p^3$ arranged between said grooved plates, substantially as and for the purposes set forth.

3. In an air-pump-operating mechanism, the combination, with a casing and its mechanism therein, of a wheel-support on the outer side of said casing, having a gooseneck provided with an air-outlet, and a cap removably arranged over said outlet, substantially as and for the purposes set forth.

4. In combination with pumping mechanism inclosed in a casing, a rigid wheel-support on the outer side of said casing, comprising a pair of grooved sections, a tube connected with the pump mechanism and arranged in said grooved sections, and means for securing said sections together, substantially as and for the purposes set forth.

5. In combination with pumping mechanism inclosed in a casing, a rigid wheel-support comprising a pair of separable sections on the outer side of said casing, said support having a gooseneck and an opening therein, and means connected with said support and pumping mechanism for conveying air from said pumping mechanism into and through said support to the tire of a wheel on said support, substantially as and for the purposes set forth.

In testimony that I claim the invention set forth above I have hereunto set my hand this 2d day of October, 1899.

CLEMENT C. CLAWSON.

Witnesses:
FREDK. C. FRAENTZEL,
HARRY MARTIN.